United States Patent
Sun et al.

(10) Patent No.: US 10,425,855 B2
(45) Date of Patent: Sep. 24, 2019

(54) METHODS FOR ACQUIRING AND FEEDING BACK CHANNEL STATE INFORMATION, BASE STATION AND TERMINAL

(71) Applicant: Samsung Electronics Co., Ltd, Gyeonggi-do (KR)

(72) Inventors: Pengfei Sun, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 234 days.

(21) Appl. No.: 15/224,610

(22) Filed: Jul. 31, 2016

(65) Prior Publication Data
US 2017/0034733 A1 Feb. 2, 2017

(30) Foreign Application Priority Data

Jul. 31, 2015 (CN) .......................... 2015 1 0463243
Jan. 21, 2016 (CN) .......................... 2016 1 0040716

(51) Int. Cl.
| | | |
|---|---|---|
| H04W 28/02 | (2009.01) | |
| H04B 7/06 | (2006.01) | |
| H04L 12/26 | (2006.01) | |
| H04L 5/00 | (2006.01) | |

(52) U.S. Cl.
CPC ...... *H04W 28/0236* (2013.01); *H04B 7/0617* (2013.01); *H04L 5/006* (2013.01); *H04L 5/0048* (2013.01); *H04L 43/12* (2013.01)

(58) Field of Classification Search
CPC .......... H04L 2012/5608; H04W 84/12; H04W 88/08; H04W 80/04; H04W 88/06; H04W 84/18; H04W 74/08

USPC .... 370/310.2, 328, 338, 332, 334, 230, 335, 370/236
See application file for complete search history.

(56) References Cited

U.S. PATENT DOCUMENTS

| | | | |
|---|---|---|---|
| 9,191,957 B2* | 11/2015 | Kim ................... | H04W 72/046 |
| 2006/0023624 A1* | 2/2006 | Han ..................... | H04L 1/0003 |
| | | | 370/204 |

(Continued)

FOREIGN PATENT DOCUMENTS

WO    2014073846 A1    5/2014

OTHER PUBLICATIONS

International Search Report dated Oct. 26, 2016 in connection with International Application No. PCT/KR2016/008414, 3 pages.

*Primary Examiner* — Brenda H Pham

(57) ABSTRACT

A method for acquiring channel state information, includes transmitting, by a transmitting end, a first probing signal and a second probing signal in at least one probing zone, receiving, from a receiving end, channel state information acquired based on measurement of the first probing signal and the second probing signal, wherein the channel state information includes one or more of beam width information, adaptively quantized channel direction information, or predicted channel quality information. A terminal includes a signal receiving module adapted to receive a first probing signal and a second probing signal in at least one probing zone, and a feedback module adapted to acquire channel state information based on the first probing signal and the second probing signal, feed back the channel state information to a transmitting end.

10 Claims, 10 Drawing Sheets

(56) References Cited

U.S. PATENT DOCUMENTS

| | | | |
|---|---|---|---|
| 2006/0039494 A1* | 2/2006 | Kim | H04B 7/0617 375/267 |
| 2014/0146863 A1 | 5/2014 | Seol et al. | |
| 2014/0177745 A1 | 6/2014 | Krishnamurthy et al. | |
| 2014/0192917 A1* | 7/2014 | Nam | H04B 7/0417 375/267 |
| 2015/0208443 A1 | 7/2015 | Jung et al. | |
| 2015/0289281 A1* | 10/2015 | Kim | H04L 5/0023 375/267 |
| 2016/0095102 A1* | 3/2016 | Yu | H04L 5/0057 455/452.2 |
| 2017/0026101 A1* | 1/2017 | Kang | H04B 7/0413 |

* cited by examiner

METHODS FOR ACQUIRING AND FEEDING BACK CHANNEL STATE INFORMATION, BASE STATION AND TERMINAL

CROSS-REFERENCE TO RELATED APPLICATIONS AND CLAIM OF PRIORITY

The present application is related to and claims the benefit under 35 U.S.C. § 119(a) of a Chinese patent application filed on Jul. 31, 2015 in the State Intellectual Property Office of the P.R.C and assigned Application Number 201510463243.3, and a Chinese patent application filed on Jan. 21, 2016 in the State Intellectual Property Office of the P.R.C and assigned Application Number 201610040716.3, the entire disclosures of which are hereby incorporated by reference.

TECHNICAL FIELD

The present disclosure relates to radio communication techniques, and more particularly, to methods for acquiring and feeding back channel state information, a base station and a terminal.

BACKGROUND

Multiple-Input-Multiple-Output (MIMO) may increase the spectrum efficiency of the wireless communications system exponentially through utilizing space resources and therefore has become one of important techniques of cellular communications. However, in order to obtain the spectrum gain, a transmitter has to know Channel Direction Information (CDI), so as to perform precoding calculation and other MIMO signal processing. The CDI and Channel Quality Information (CQI) form complete Channel State Information (CSI). For a MIMO system, it is a prerequisite for close-loop MIMO transmission that the transmitter obtains accurate CDI, which is also a key factor affecting system performance.

Long Term Evolution (LTE) system corresponding to the Evolved Universal Terrestrial Radio Access (E-UTRA) protocol provided by the 3rd Generation Partnership Project (3GPP) has different CDI obtaining manners with respect to different duplexing modes. The duplexing modes of the LTE include: Time Division Duplexing (TDD) and Frequency Division Duplexing (FDD).

In a TDD system, uplink channel and downlink channel have a property of reciprocity. Therefore, a TDD base station may obtain the equivalent CDI of the downlink channel through performing channel estimation to the uplink channel. For assisting the channel estimation, the terminal transmits omnidirectional Sounding Reference Signal (SRS) which is generated adopting a particular pseudo-random sequence, e.g. Zadoff-Chu (ZC) sequence. Both the terminal and the base station know the adopted sequence. The biggest defect of obtaining the CDI based on transmitting the SRS and the channel estimation in the TDD system is a pilot contamination problem. In the LTE system, the SRS sequences assigned to different terminals of the same cell are orthogonal. Therefore, the base station may perform channel estimation without any interference according to the SRS sequences of different terminals to obtain the CDI of their uplink channels. However, in the LTE system, the SRS sequences assigned to the terminals in different cells are non-orthogonal, and even a plurality of terminals may use the same SRS sequence, i.e., the so-called SRS collision. In the case of SRS collision, the base station also receives uplink SRS signals from terminals in other cells while estimating the uplink channel CDI of the terminal of the present cell. Therefore, the CDI of the channel of the present cell estimated by the base station also involves the CDI of the channels between the terminals of the other cell and the base station, which is referred to as pilot contamination. The pilot contamination has serious impacts to both uplink and downlink data transmissions: 1) when the base station transmits data with directional precoding via a downlink channel to an expected terminal, the directional data is also transmitted to the terminals of the adjacent cell on the co-channel, which results in serious inter-cell interference; 2) if the base station performs directional post-processing to receive data from the expected terminal via an uplink channel, enhancement processing is also performed to the data of the terminal of the adjacent cell on the co-channel, thus the interference on the co-channel is enlarged. Due to the above reasons, the pilot contamination seriously restricts the system capacity. Especially when the number of antennas increases, there will be a bottle neck for the promotion of the system performance.

Large-scale antenna array system (large-scale MIMO or Massive MIMO) is a main candidate technique for the 5th generation cellular communications standard. The large-scale antenna makes it possible to use a high signal processing freedom to greatly reduce the interference between terminals and interference between cells. It has low computation complexity and is able to effectively improve quality of communication links. In addition, the large-scale antenna is able to effectively decrease power consumption of a single antenna unit and increase the energy efficiency of the whole system. Existing experiments have sufficiently proved the feasibility of configuring dozens or even hundreds of antennas for one base station. One implementation on the millimeter wave band is as follows: through configuring the large-scale antenna array for the base station, when the distance between antennas is very small, an extremely narrow transmission beam is formed utilizing phase difference between antennas to serve multiple terminals. At the same time, the terminal may also be configured with multiple antennas to produce different gains for different directions-of-arrival and select a beam with a larger gain to realize data receiving. If each transmission beam of the base station serves one terminal, the interference between terminals are decreased greatly. If adjacent base stations serve their respective terminals using transmission beams in different directions, the interference between cells is decreased greatly. Theoretical result shows that, in a large-scale antenna system, if the transmitter knows the accurate CDI of the channel of the terminal, the available Signal-to-Noise Ratio (SNR) of the uplink and downlink channels increases with the increase of the number of the antennas. In the case of dozens of or even hundreds of transmission antennas, the system capacity is dramatically increased accordingly. However, if there is pilot contamination, the actual capacity of the large-scale antenna system will decrease sharply, even if the transmission power of the base station is relatively low, the whole system is interference limited. The pilot contamination has a fatal impact to the large-scale antenna system. Therefore, it is significant to design a new CDI obtaining manner to overcome the pilot contamination problem in the large-scale antenna system.

In the FDD system, the uplink and downlink channels are asymmetric since they are on different frequency bands. The base station cannot obtain the downlink channel CDI through estimating the uplink channel. In this situation, the terminal has to feed back the CDI and CQI of the downlink channel to the base station by occupying some uplink channel resources. One method is explicit feedback. The terminal quantizes the CDI of the downlink channel with a fixed codebook and performs a multi-level quantization to the CQI, and reports the quantized result to the base station via the uplink channel. Another method is implicit feedback. The terminal selects an expected precoding from several fixed precoding according to the CDI of the downlink channel, and reports the selected result and the CQI corresponding to the selected CDI to the base station via the uplink channel. In order to realize the above, the base station has to perform precoding to a reference signal with different CDI. The terminal measures the reference signal, so as to obtain the signal power of the corresponding CDI and determine the CQI. Whichever method is adopted, the FDD system has to bear two kinds of necessary overheads in order to enable the base station to obtain accurate CSI of the downlink channel: reference signal overhead and feedback overhead. At the same time, the two kinds of overheads must increase with the number of antennas. Higher feedback quantization accuracy means higher overhead. This means that the manner for obtaining the CDI based on the feedback in the FDD system faces a challenge on how to reduce overhead when the large-scale antenna system is applied.

Another important problem is how to perform precoding to the downlink data channel in the presence of the CDI measurement error and the feedback latency. If the CDI feedback accuracy is low and the terminal moves with a high speed, the downlink data of the base station may deviate from the optimum channel direction and thus result in decrease of system performance.

In view of the above, in the design of the 5G communications system, it is an urgent problem to be solved as to the obtaining of the CDI in the large-scale antenna array system. Through designing a rapid and effective CDI obtaining method, reference signal and signaling overheads of the system may be decreased effectively. At the same time, it avoids the possibility that the base station uses incorrect CDI, ensures the spectrum gain brought out by the large-scale antenna, so as to increase the system capacity of the cell.

SUMMARY

To address the above-discussed deficiencies, it is a primary object to provide a method for acquiring channel state information, a method for feeding back channel state information, a base station and a terminal, so as to reduce signaling overhead, and prevent the base station from acquiring invalid channel state information.

According to an embodiment of the present disclosure, a method for acquiring channel state information includes: transmitting, by a transmitting end, a first probing signal and a second probing signal in at least one probing zone; and receiving, from a receiving end, channel state information acquired by measurement of the first probing signal and the second probing signal; wherein the channel state information comprises one or more of: beam width information, adaptively quantized channel direction information, and predicted channel quality information.

In one embodiment, there is differential relationship between beamforming weights of the first probing signal and beamforming weights of the second probing signal, a former part of beamforming weights of the second probing signal is the same with that of the first probing signal, and a latter part of the beamforming weights of the second probing signal and that of the first probing signal are opposites.

In one embodiment, the beamforming weights of the first probing signal are as follows:

$$w1 = \left[1, e^{j2\pi \frac{d}{\lambda}\sin(\theta_{prob})}, \ldots e^{j2\pi(\frac{N}{2}-1)\sin(\theta_{prob})d/\lambda}, e^{j2\pi(\frac{N}{2})\sin(\theta_{prob})d/\lambda} \ldots e^{j2\pi(N-1)\sin(\theta_{prob})d/\lambda}\right]^T$$

the beamforming weights of the second probing signal are as follows:

$$w2 = \left[1, e^{j2\pi \frac{d}{\lambda}\sin(\theta_{prob})}, \ldots e^{j2\pi(\frac{N}{2}-1)\sin(\theta_{prob})d/\lambda}, -e^{j2\pi(\frac{N}{2})\sin(\theta_{prob})d/\lambda} \ldots -e^{j2\pi(N-1)\sin(\theta_{prob})d/\lambda}\right]^T$$

wherein $\theta_{prob}$ denotes a transmission central angle of the first probing signal and the second probing signal, N denotes the number of antennas at the transmitting end, d denotes a distance between antennas, $\lambda$ denotes wave length;

the beamforming weights w1 of the first probing signal are a N-dimension vector, the nth element of the N-dimension vector is $$e^{j2\pi(n-1)\frac{d}{\lambda}\sin(\theta_{prob})},$$

where $1 \leq n \leq N$;

the beamforming weights w2 of the second probing signal are a N-dimension vector, former N/2 elements of the N-dimension vector of the second probing signal are the same as former N/2 elements of the beamforming weights of the first probing signal, and later N/2 elements of the N-dimension vector of the second probing signal and later N/2 elements of the beamforming weights of the first probing signal are opposites.

In one embodiment, the beam width information comprises one or more of beam widths obtained by the transmitting end using different antenna weights.

In one embodiment, the method further includes: adjusting, by the transmitting end, an antenna weight to make the width of the transmission beam equal to the beam width indicated by the beam width information.

In one embodiment, the adaptively quantized channel direction information comprises quantization accuracy and channel direction information corresponding to the quantization accuracy.

In one embodiment, the method further includes: retrieving, by the transmitting end, the channel direction information according to the quantization accuracy in the adaptively quantized channel direction information, and aligning a beamforming central direction with the retrieved channel direction information.

In one embodiment, the predicted channel quality information is a modulation and coding scheme to be used by the transmitting end after adjusting a beamforming pattern.

In one embodiment, the method further includes: the transmitting end transmitting data according to the modulation and coding scheme.

The present disclosure also provides a base station, including: a signal transmitting module and a feedback receiving module; wherein the signal transmitting module is adapted to transmit a first probing signal and a second probing signal in at least one probing zone; and the feedback receiving module is adapted to receive from a receiving end channel state information which is acquired based on measurement of the first probing signal and the second probing signal; wherein the channel state information includes one or more of: beam width information, adaptively quantized channel direction information, and predicated channel quality information.

The present disclosure also provides a method for feeding back channel state information, including: receiving, by a receiving end, a first probing signal and a second probing signal in at least one probing zone; and acquiring channel state information based on the first probing signal and the second probing signal, and feeding back the channel state information to a transmitting end; wherein the channel state information comprises one or more of: beam width information, adaptively quantized channel direction information, and predicated channel quality information.

In one embodiment, there is differential relationship between beamforming weights of the first probing signal and beamforming weights of the second probing signal, a former part of beamforming weights of the second probing signal is the same with that of the first probing signal, and a latter part of the beamforming weights of the second probing signal and that of the first probing signal are opposites.

In one embodiment, the method further includes: obtaining, by the receiving end, a moving angular speed of the receiving end via measurement of the first probing signal and the second probing signal, and determining the beam width information according to a channel quality and the moving angular speed.

In one embodiment, the method further includes: selecting, by the receiving end, quantization accuracy according to an SNR of a reference signal and the moving angular speed, and acquiring the channel direction information by performing quantization according to the selected quantization accuracy.

In one embodiment, the method further includes: predicting a modulation and coding scheme to be used by a transmitting end after the transmitting end adjust the beamforming weights according to the channel direction information and/or beam width information fed back by the receiving end, and taking the predicted modulation and coding scheme as the predicated channel quality information.

In one embodiment, the predication is performed based on measurement of the first probing signal and the second probing signal.

The present disclosure also provides a terminal, including: a signal receiving module and a feedback module; wherein the signal receiving module is adapted to receive a first probing signal and a second probing signal in at least one probing zone; and the feedback module is adapted to acquire channel state information based on the first probing signal and the second probing signal, feed back the channel state information to a transmitting end; wherein the channel state information comprises one or more of: beam width information, adaptively quantized channel direction information, and predicated channel quality information.

It can be seen from the above technical solution that, in the technical solution provided by the present disclosure, the transmitting end transmits a first probing signal and a second probing signal in at least one probing zone, such that the receiving end is able to acquire the channel state information such as the beam width information, adaptively quantized channel direction information and predicted channel quality information based on measurement of the first probing signal and the second probing signal. After the channel state information is fed back to the transmitting end, the receiving end is able to adjust the direction and beam width of the beamforming and the modulation and coding scheme, so as to reduce the signaling overhead for the feedback, and prevent the base station from acquiring invalid channel state information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

The present disclosure will be described in further detail hereinafter with reference to accompanying drawings and embodiments to make the objective, technical solution and merits therein clearer.

The present disclosure provides a method for acquiring channel state information, which is able to increase the efficiency for feeding back the channel state information, decrease feedback overhead and increase the efficiency of beamform transmission based on the feedback. The present disclosure may be applied in a large-scale antenna array system on a conventional frequency band or a large-scale antenna array system based on millimeter waves.

Figure 1:
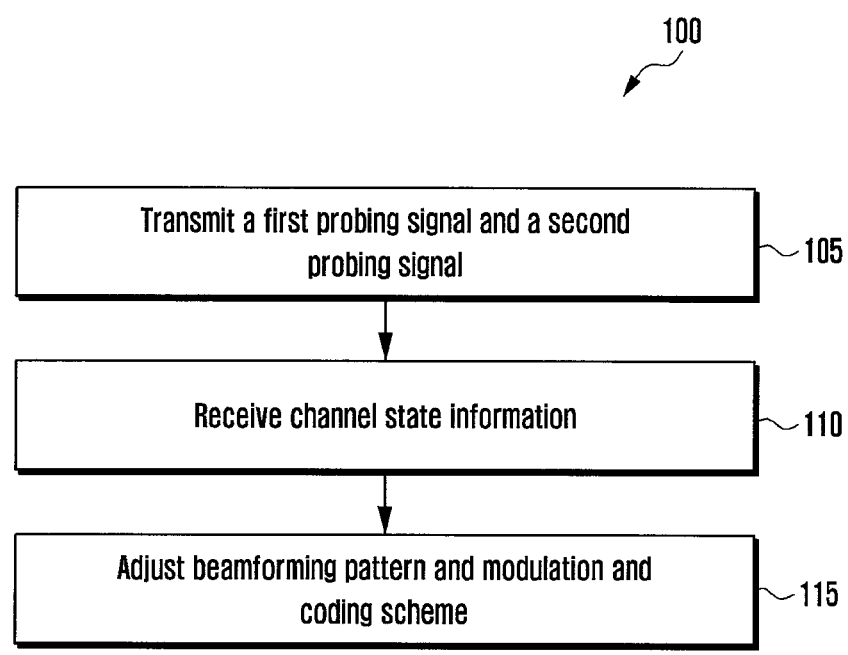
FIG. 1 is a flowchart illustrating a method for acquiring channel state information based on probing signals at a transmitting end according to an embodiment of the present disclosure.

FIG. 1 is a flowchart 100 illustrating a method for acquiring channel state information based on probing signals at a transmitting end according to an embodiment of the present disclosure. The flowchart shows main operations at the base station, which can include the following.

At block 1 105, the transmitting end transmits a first probing signal and a second probing signal in at least one probing zone.

At block 2 110, the transmitting end receives channel state information fed back by a terminal. The channel state information is acquired based on measurement of the first probing signal and the second probing signal. The channel state information includes one or more of: beam width information, adaptively quantized channel direction information and predicted channel quality information.

At block 3 115, the transmitting end transmits data utilizing corresponding beamforming pattern and modulation and coding scheme based on the channel state information. In particular:

the beam width information includes one or more of beam widths can be obtained by the terminal using different antenna weights; the transmitting end adjusts the weight of the antenna to make the width of the transmission beam equal to beam width indicated by the beam width information;

the adaptively quantized channel direction information includes quantization accuracy and channel direction information corresponding to the quantization accuracy; the transmitting end retrieves channel direction information according to the quantization accuracy in the adaptively quantized channel direction information, and aligns the beamforming central direction to the retrieved channel direction; and the predicted channel quality information is the modulation and coding scheme to be adopted by the transmitting end after adjusting the beamforming pattern; the transmitting end transmits data according to the modulation and coding scheme.

After the adjustment, the transmitting end uses the corresponding beam width, the beamforming central direction and the indicated modulation and coding scheme to transmit data.

Figure 2:
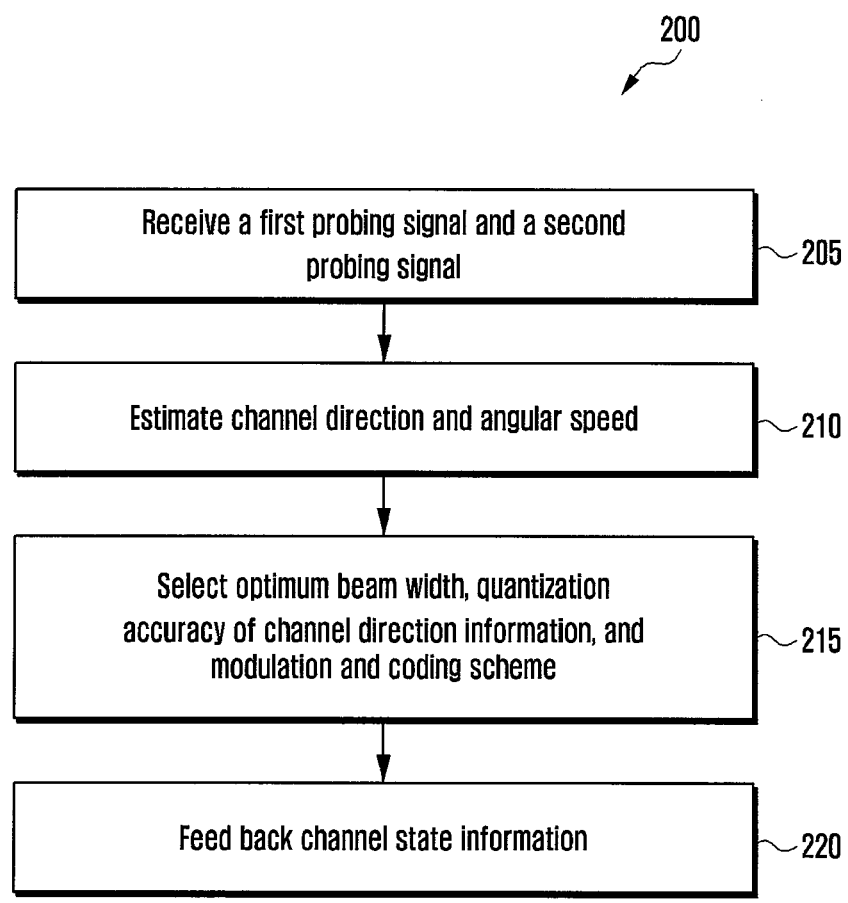
FIG. 2 is a flowchart illustrating a method for feeding back channel state information based ion probing signals at a receiving end according to an embodiment of the present disclosure.

FIG. 2 is a flowchart 200 illustrating a method for acquiring channel state information based on probing signals at a receiving end according to an embodiment of the present disclosure. This flowchart shows main operations of the terminal, which includes the following.

At block 1 205, the receiving end receives a first probing signal and a second probing signal in at least one probing zone.

At block 2 210, channel direction information is estimated according to the first probing signal and the second probing signal, the channel direction information is monitored continuously to estimate a moving angular speed of the terminal.

At block 3 215, optimum beam width, quantization accuracy of the channel direction information and optimum modulation and coding scheme are selected.

At block 4 220, the channel state information is fed back to the transmitting end, wherein the channel state information includes one or more of: beam width information, adaptively quantized channel direction information, predicted channel quality information.

Embodiment 1

Figure 3:
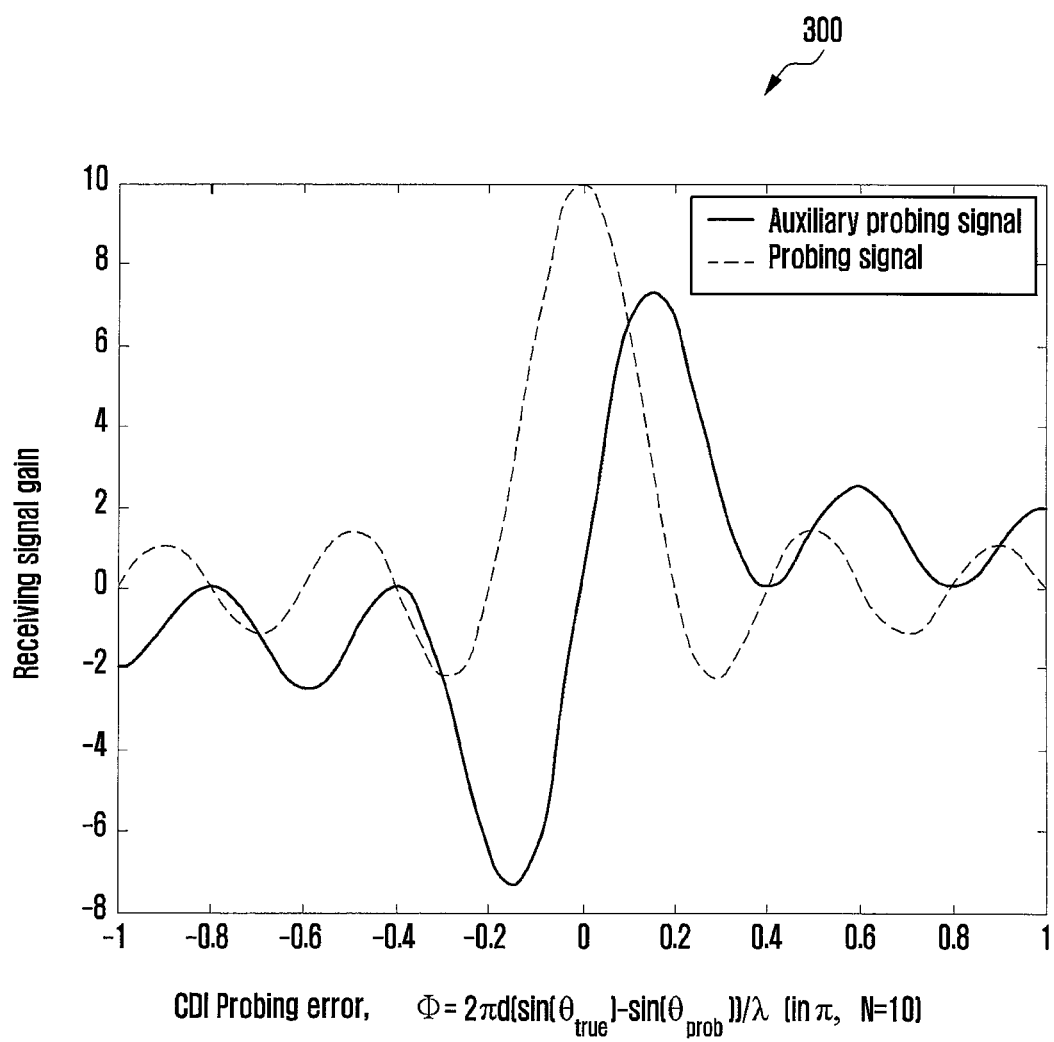
FIG. 3 is a schematic diagram illustrating responses in different directions of a first probing signal and a second probing signal according to an embodiment of the present disclosure.
Figure 4:
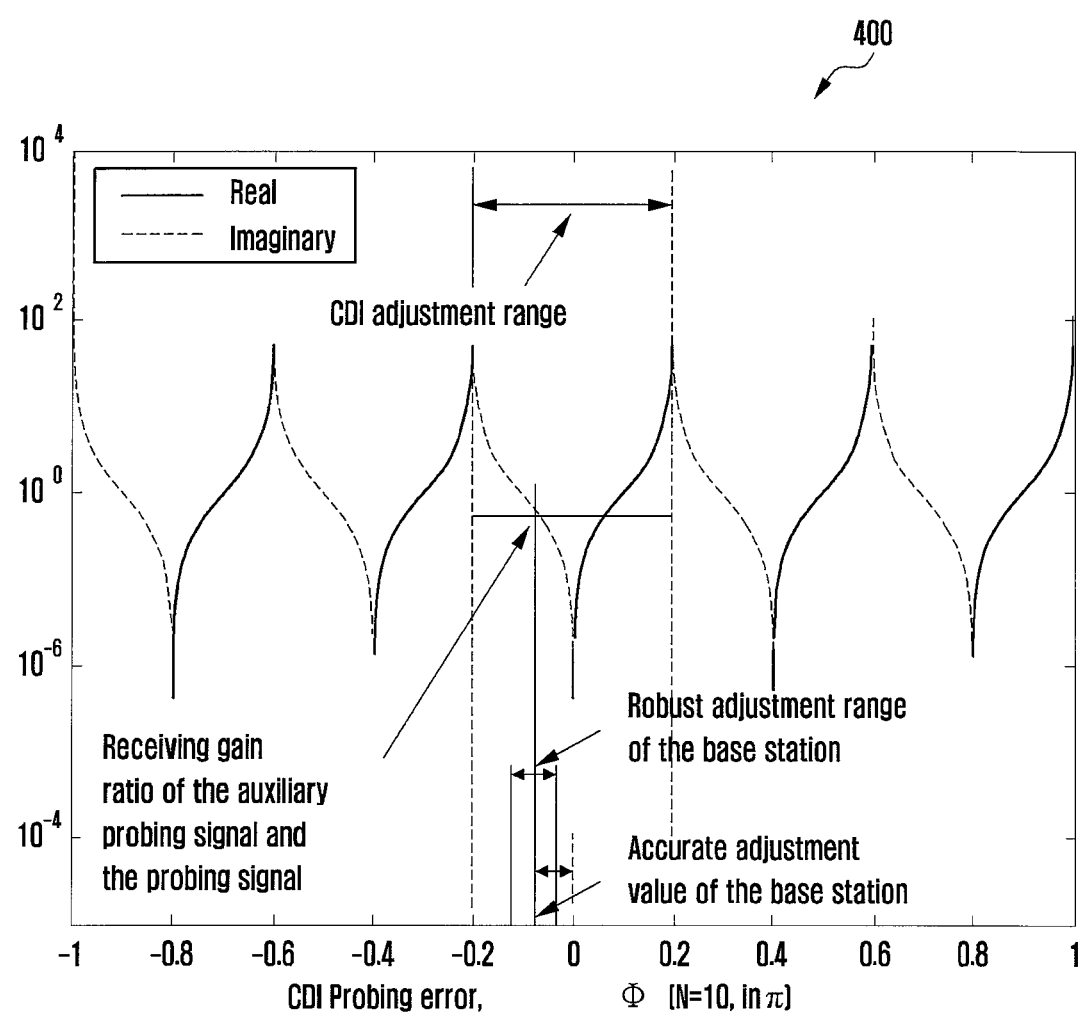
FIG. 4 is a schematic diagram illustrating detection of channel direction error based on a differential method according to an embodiment of the present disclosure.

Hereinafter, the transmission beamforming method of a CDI probing signal is described with reference to FIGS. 3 and 4.

The beamforming method utilized by the base station for transmitting the first probing signal and the second probing signal includes: using different beamforming weights on different antennas, such that there is differential relationship between beamforming weights of the first probing signal and beamforming weights of the second probing signal. A former part of beamforming weights of the second probing signal is the same with that of the first probing signal, and a latter part of the beamforming weights of the first probing signal and that of the second probing signal are opposites. It should be noted that, the first probing signal and the second probing signal can be the same signal on different time-frequency resources. The difference of them is their beamforming weights are different. In particular:

the beamforming weights (or referred to as beamforming weight) used by the first probing signal are:

$$w1 = \left[1, e^{j2\pi\frac{d}{\lambda}\sin(\theta_{prob})}, \ldots e^{j2\pi\left(\frac{N}{2}-1\right)\sin(\theta_{prob})d/\lambda}, e^{j2\pi\left(\frac{N}{2}\right)\sin(\theta_{prob})d/\lambda} \ldots e^{j2\pi(N-1)\sin(\theta_{prob})d/\lambda}\right]^T,$$

the beamforming weights used by the second probing signal (the first probing signal can also be referred to as probing signal, accordingly the second probing signal is referred to as auxiliary probing signal) are:

$$w2 = \left[1, e^{j2\pi\frac{d}{\lambda}\sin(\theta_{prob})}, \ldots e^{j2\pi\left(\frac{N}{2}-1\right)\sin(\theta_{prob})d/\lambda}, -e^{j2\pi\left(\frac{N}{2}\right)\sin(\theta_{prob})d/\lambda} \ldots -e^{j2\pi(N-1)\sin(\theta_{prob})d/\lambda}\right]^T,$$

wherein, $\theta_{prob}$ denotes a transmission central angle of the first probing signal and the second probing signal, referred to as probing angle, N denotes the number of antennas at the transmitting end, d denotes a distance between antennas, $\lambda$ denotes wave length. In other words, the beamforming weights w1 of the first probing signal is a N-dimension vector, its first n elements are denoted by $$w1(n) = e^{j2\pi(n-1)\frac{d}{\lambda}\sin(\theta_{prob})},$$

where $1 \le n \le N$. The beamforming weights w2 of the second probing signal is a N-dimension vector, its former N/2 elements are the same as former N/2 elements of the beamforming weights of the first probing signal, and its later N/2 elements and the later N/2 elements of the beamforming weights of the first probing signal are opposites (corresponding elements have opposite signs).

Suppose that a true channel direction of the terminal is $\theta_{true}$, there is a deviation $\Phi$ between the probing angle and the true channel direction of the terminal. As shown in the graph 300 illustrated in FIG. 3, the two probing signals can have different receiving signal gains with respect to different values of $\Phi$. Therefore, the two probing signals have a group of differential channel direction responses. The receiving end can perform a differential detection according to the differential information to acquire the channel direction information $\theta_{true}$.

The receiving end performs the differential detection through calculating a gain ratio of the two probing signals. As shown in the graph 400 illustrated in FIG. 4, if the deviation between the true channel direction and the probing central angle is less than 0.2, the ratio of them and the actual deviation have a one-to-one corresponding relationship. If the deviation is a positive number, the receiving gain ratio of the auxiliary probing signal and the probing signal is a real number. If the deviation is a negative number, the receiving gain ratio of the auxiliary probing signal and the probing signal is an imaginary number. With the increase of the absolute value of the deviation, the receiving gain ratio increases monotonically. Therefore, for different terminals within the range of (−0.2, 0.2) with the probing central angle as the center, the terminal is always able to estimate the deviation with respect to the probing central angle through measuring the gain ratio of the two probing signals.

In comparison, the conventional method can compare merely the receiving gains of the terminal in multiple beam directions and then select a beam direction with a highest gain. In other words, the conventional method cannot obtain a resolution higher than the beam width of the probing signal. However, the above differential method is always able to acquire accurate channel direction information in the probing zone, which means that the differential method is able to obtain measurement accuracy far higher than the conventional method.

Figure 5A:
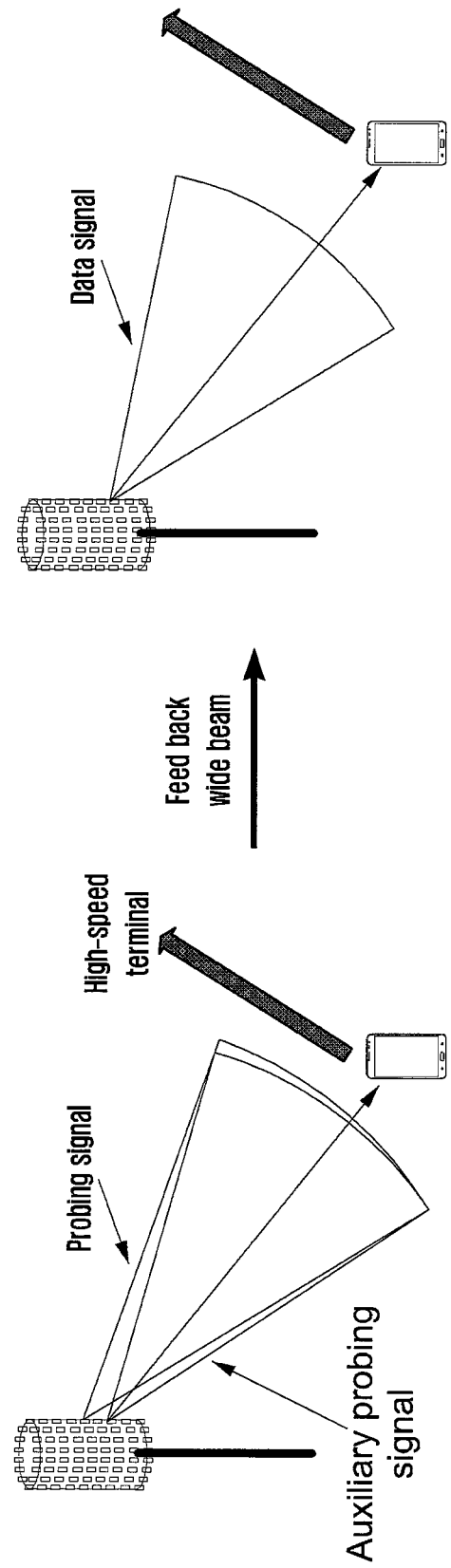
FIGS. 5A and 5B are schematic diagrams illustrating feedback of beam width information and beam adjustment according to embodiments of the present disclosure.
Figure 5B:
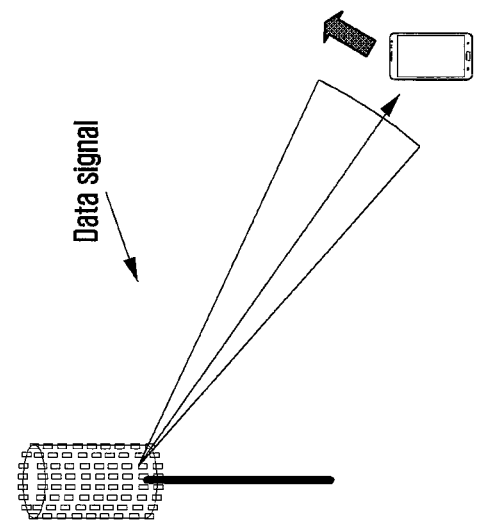
Figure 5B:
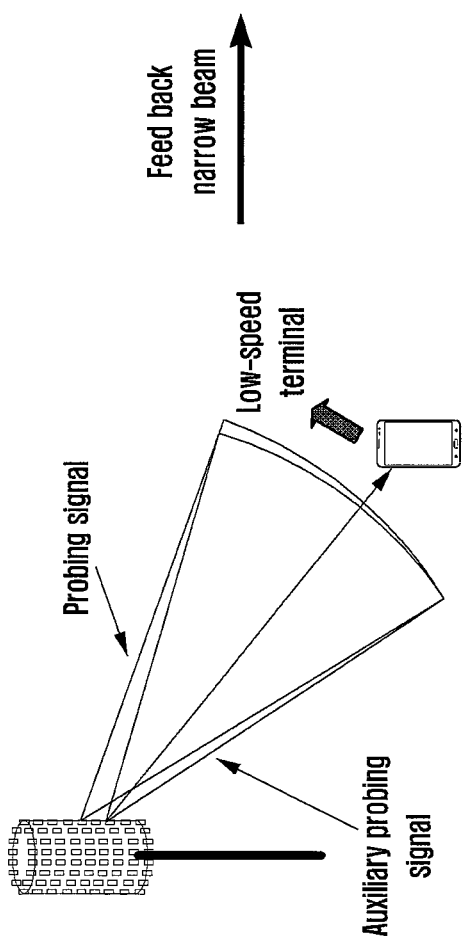

Since the differential method is able to provide accurate channel direction information measurement within the probing zone, the receiving end gets a new possibility of estimating the angular speed of the terminal through continuously monitoring the channel direction information. Just like that the terminal can estimate the speed in the vertical direction with respect to the base station according to Doppler frequency shift, the terminal can obtain the angular speed with respect to the base station through measuring the changing rate of the channel direction angle. One simple method is to measure the amount of change of the channel direction angle within a time unit. For example, the terminal deduces the angular speed $r = (\hat{\theta}_2 - \hat{\theta}_1)/t$ of the terminal according to the channel direction information $\hat{\theta}_1$ and $\hat{\theta}_2$ obtained according to the two probing signals. Since the angular speed of the terminal determines the sensitivity of the terminal to the direction information accuracy, the higher the angular speed, the higher the probability that the terminal deviates from the beamforming central direction. It is known at the same time that, the wider the beamforming, the smaller the change of the receiving power due to deviation of the terminal from the beamforming central direction. Therefore, a new channel state information index is introduced in the present disclosure: Beam Width Information (BWI), used for indicating beam width information. The method includes: defining a plurality of beam widths in the system in advance, the receiving end selecting an optimum beam width through estimating its angular speed. The selection principle of the beam width is as follows: the terminal with a higher angular speed selects a wider beam width so as to ensure the reliability of the link; a terminal with a lower angular speed selects a narrower beam so as to increase receiving signal power. FIGS. 5A and 5B are schematic diagrams illustrating the above beam width feedback and beam width adjustment according to embodiments of the present disclosure. At the same time, the accuracy of the channel direction measurement can also act as a reference. If there is a relatively large error in the channel direction estimation, a wider beam is selected to ensure the reliability of the link.

Embodiment 2

Based on the above method, the receiving end is able to measure the channel direction information accurately. However, a certain amount of additional overhead is required to feed back the quantized channel direction information to the base station. Therefore, the quantization of the channel direction information needs to consider the balance of the overhead and the efficiency. Higher quantization accuracy means that the base station can use more accurate beamforming but occupy more uplink control signaling. On the contrary, lower quantization accuracy helps to reduce feedback overhead but can decrease beamforming efficiency of the base station. Therefore, an adaptive selection of the quantization accuracy can have a tradeoff between them, so as to improve the system performance. A series of quantization accuracies can be defined in advance, from coarse scale to fine scale. The receiving end selects optimum quantization accuracy according to the measured channel state. For example, if the SNR of the terminal is relatively low or the moving speed of the terminal is relatively high, high quantization accuracy cannot effectively increase beamforming efficiency. The reason is that the low SNR decreases the estimation accuracy of the channel direction information and the high moving speed degrades the timeliness of the channel information at the same time, even if the fed back channel direction information is very accurate, the beamforming of the base station will deviate from the optimum direction. Therefore, the terminal can select the optimum quantization accuracy according to the measured SNR and the moving speed. One feasible method is to let the quantization error smaller than estimation error and the error caused by feedback latency. At the same time, the terminal indicates the selected quantization accuracy in the feedback information. Since the angle of the probing zone is fixed, the adaptive selection of the quantization accuracy can also reduce unnecessary feedback overhead effectively. Table 1 shows multi-level quantization accuracies of a probing zone of $0.4\pi$.

TABLE 1

| Quantization level | a | b | c |
|---|---|---|---|
| Number of quantization bits | 2 | 3 | 4 |
| Quantization error | $0.1\ \pi$ | $0.05\ \pi$ | $0.025\ \pi$ |
| Matching SNR | 5 dB | 10 dB | 20 dB |

Embodiment 3

Channel Quality Index (CQI) is also an important index in the channel state information. The CQI indicate the optimum modulation and coding scheme that can be used by the base station. In the above large-scale antenna system, the beamforming technique is able to effectively improve the SNR of the received signal. The base station can adjust the beamforming according to the fed back channel state information, including direction adjustment and beam width adjustment. The adjustments can affect the CQI measurement of the terminal. For example, if the beamforming is able to align the beam with the terminal more accurately, the terminal can use a higher level modulation order or higher code rate because of the high SNR. Since the present disclosure adopts a channel state information acquisition method with high accuracy, the terminal is able to accurately know the deviation between the channel direction and the current beamforming central angle. This provides a new possibility that the terminal can predict the SNR after the beam adjustment according to the deviation, i.e., the optimum modulation and coding scheme after the beam adjustment. The terminal can feed the predicted CQI back to the base station, without the need of measuring the CQI after the beam adjustment. It should be noted that, the prediction of the CQI after the beam adjustment can be realized merely when the highly accurate channel direction information is known. Therefore, conventional channel direction information acquisition method cannot support this new feedback scheme.

Figure 6:
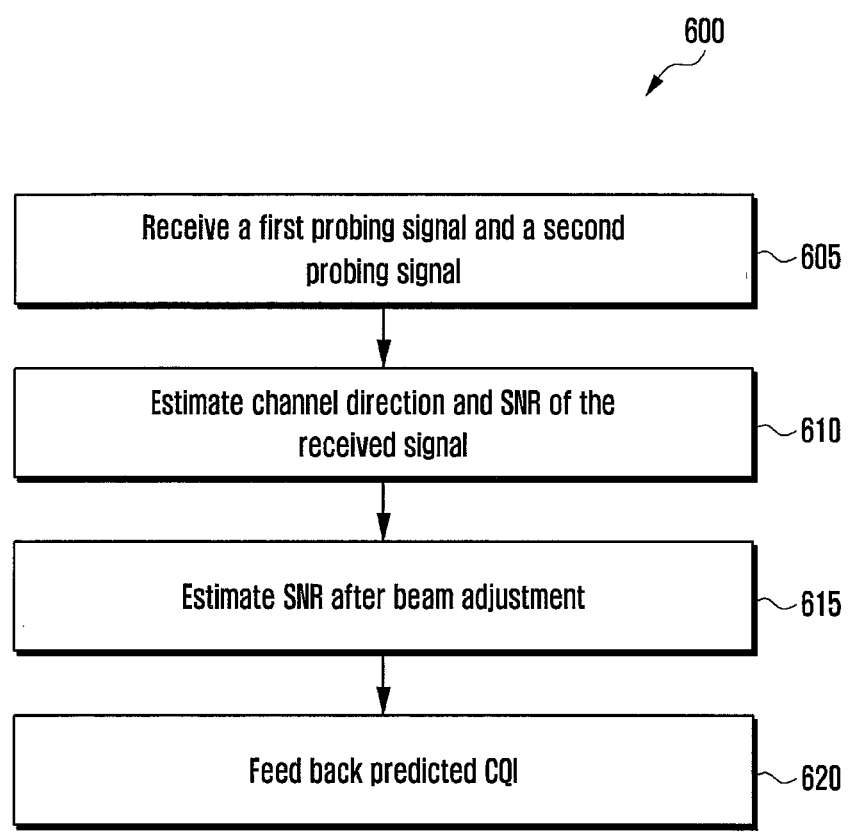
FIG. 6 is a flowchart illustrating a method for predicting CQI by a terminal according to an embodiment of the present disclosure.

FIG. 6 is a flowchart 600 illustrating feedback of the predicted CQI according to an embodiment of the present disclosure. Firstly, the terminal receives 605 the first probing signal and the second probing signal, and estimates 610 the channel direction information and the SNR of the received signal. Then, the terminal calculates change of receiving signal power after beamforming adjustment according to the beamforming method of the base station. Based on the calculated result, the terminal can predict 615 the SNR after the beam adjustment, so as to obtain the optimum CQI parameter. Finally, the terminal feeds 620 the predicted CQI parameter back to the base station.

Figure 7:
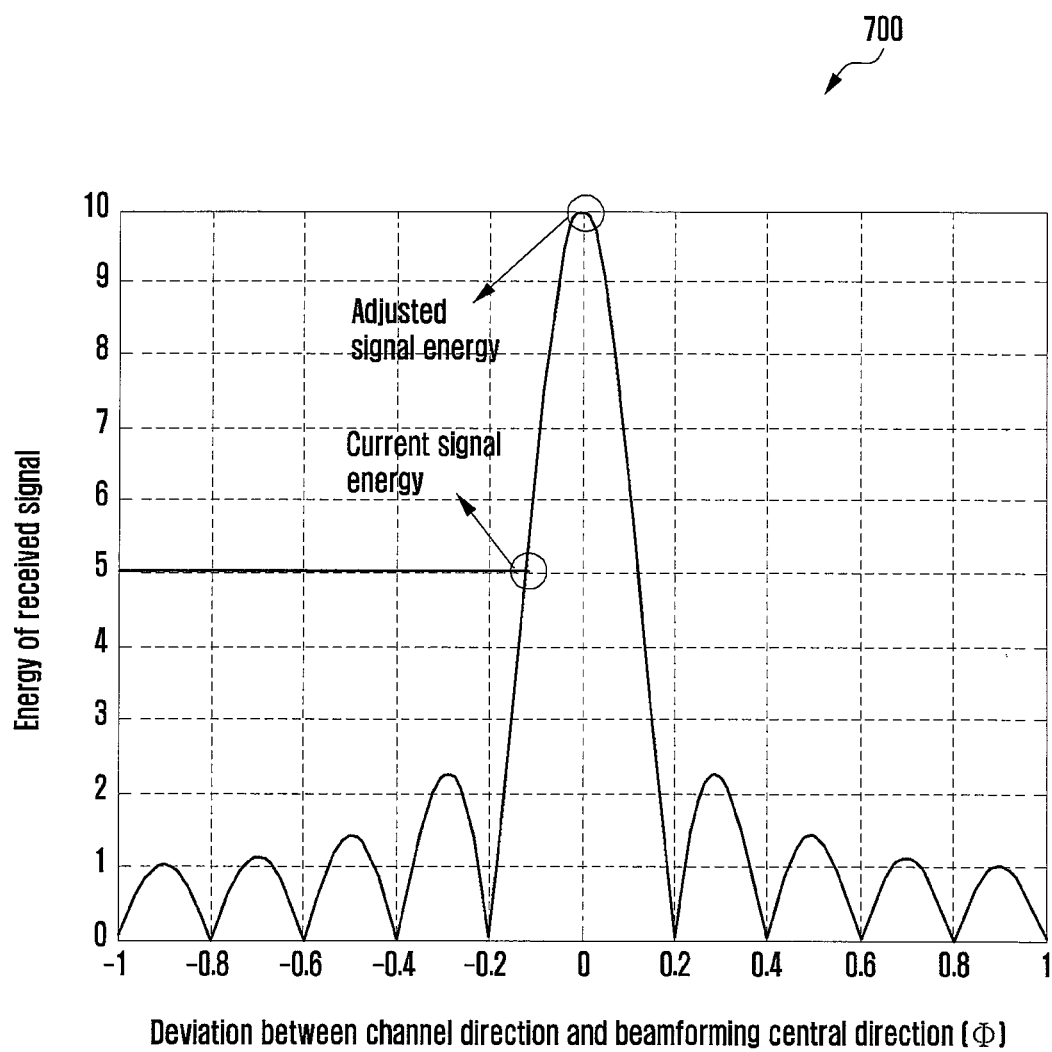
FIG. 7 is a schematic diagram illustrating a calculation method of the CQI predicted by the terminal according to the present disclosure.

FIG. 7 is a schematic diagram 700 illustrating prediction of the CQI by the terminal according to an embodiment of the present disclosure. The terminal detects through the probing signals that the difference between the channel direction and the current beamforming central angle is $0.4\pi$, the current channel gain is 5. Based on the above deviation, the terminal can obtain that the channel gain is 10 after the beamforming angle adjustment. Therefore, the SNR gain factor after the beamforming adjustment is 2. The terminal calculates the optimum CQI based on this factor and feeds back the CQI.

Figure 8:
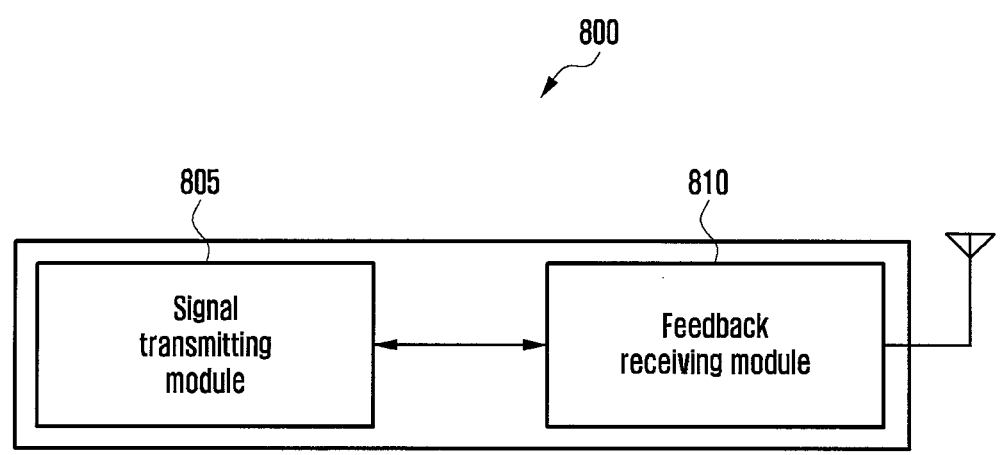
FIG. 8 is a schematic diagram illustrating a structure of a base station according to an embodiment of the present disclosure.

In accordance with the above method, the present disclosure further provides a base station. The structure of the base station is as shown in FIG. 8, including: a signal transmitting module and a feedback receiving module (e.g., receiver); wherein the signal transmitting module (e.g., transmitter) is adapted to transmit a first probing signal and a second probing signal in at least one probing zone; and the feedback receiving module is adapted to receive from a receiving end channel state information which is acquired based on the first probing signal and the second probing signal; wherein the channel state information includes one or more of: beam width information, adaptively quantized channel direction information, and predicated channel quality information.

In one embodiment, there is differential relationship between beamforming weights of the first probing signal and beamforming weights of the second probing signal transmitted by the signal transmitting module, a former part of beamforming weights of the second probing signal are the same with that of the first probing signal, and a latter part of the beamforming weights of the second probing signal have and that of the first probing signal are opposites.

In one embodiment, the beamforming weights of the first probing signal are as follows:

$$w1 = \left[1,\ e^{j2\pi\frac{d}{\lambda}\sin(\theta_{prob})},\ \ldots\ e^{j2\pi(\frac{N}{2}-1)\sin(\theta_{prob})d/\lambda},\ e^{j2\pi(\frac{N}{2})\sin(\theta_{prob})d/\lambda}\ \ldots\ e^{j2\pi(N-1)\sin(\theta_{prob})d/\lambda}\right]^T.$$

The beamforming weights of the second probing signal are as follows:

$$w2 = \left[1, e^{j2\pi \frac{d}{\lambda}\sin(\theta_{prob})}, \ldots e^{j2\pi\left(\frac{N}{2}-1\right)\sin(\theta_{prob})d/\lambda}, -e^{j2\pi\left(\frac{N}{2}\right)\sin(\theta_{prob})d/\lambda} \ldots -e^{j2\pi(N-1)\sin(\theta_{prob})d/\lambda}\right]^T,$$

wherein $\theta_{prob}$ denotes a transmission central angle of the first probing signal and the second probing signal, N denotes the number of antennas at the transmitting end, d denotes a distance between antennas, $\lambda$ denotes wave length. In other words, the beamforming weights w1 of the first probing signal is a N-dimension vector, its first n elements are denoted by $w1(n)=e^{j2\pi(n-1)d/\lambda \sin(\theta\ prob)}$, where $1 \leq n \leq N$. The beamforming weights w2 of the second probing signal is a N-dimension vector, its former N/2 elements are the same as former N/2 elements of the beamforming weights of the first probing signal, and its later N/2 elements and the later N/2 elements of the beamforming weights of the first probing signal are opposites (corresponding elements have opposite signs).

In accordance with the above method, the present disclosure further provides a terminal 800. The structure of the terminal 800 is as shown in FIG. 8, including a signal transmitting module 805 and a feedback receiving module 810.

In one embodiment, the beam width information received by the feedback receiving module includes one or more of beam widths obtained by the transmitting end using different antenna weights, and the signal transmitting module is further adapted to adjust the antenna weight to make the width of the transmission beam equal to the beam width indicated by the beam width information.

In one embodiment, the adaptively quantized channel direction information received by the feedback receiving module includes quantization accuracy and channel direction information corresponding to the quantization accuracy;

the predicted channel quality information received by the feedback receiving module is a modulation and coding scheme to be used by the transmitting end after adjusting beamforming pattern; and the signal transmitting module is further adapted to transmit data according to the modulation and coding scheme.

Figure 9:
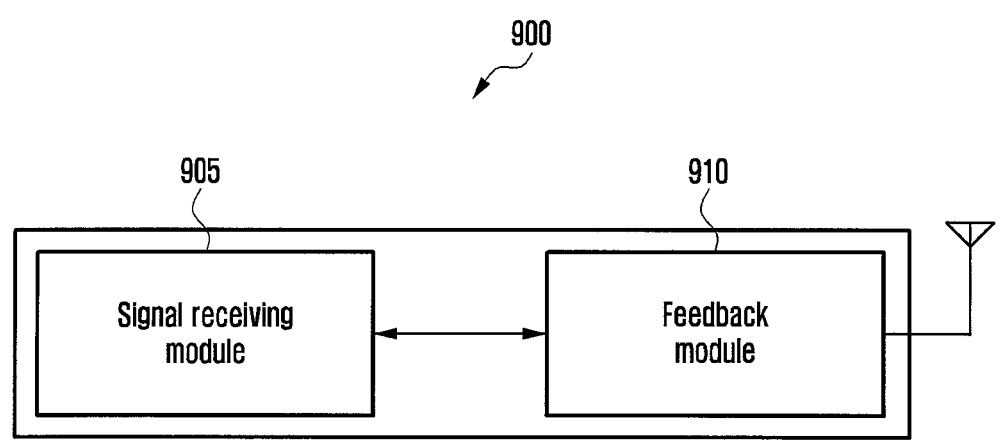
FIG. 9 is a schematic diagram illustrating a structure of a terminal according to an embodiment of the present disclosure.

In accordance with the above method, the present disclosure further provides a terminal 900. The structure of the terminal 900 is as shown in FIG. 9, including a signal receiving module 905 and a feedback module 910, wherein the signal receiving module is adapted to receive a first probing signal and a second probing signal in at least one probing zone, and the feedback module (e.g., a feedback circuitry) is adapted to acquire channel state information based on the first probing signal and the second probing signal, feed the channel state information back to the transmitting end; wherein the channel state information includes one or more of: beam width information, adaptively quantized channel direction information, and predicated channel quality information.

In one embodiment, there is differential relationship between beamforming weights of the first probing signal and beamforming weights of the second probing signal, a former part of beamforming weights of the second probing signal are the same with that of the first probing signal, and a latter part of the beamforming weights of the second probing signal and that of the first probing signal are opposites.

In one embodiment, the feedback module is adapted to obtain a moving angular speed of the receiving end through measuring the first probing signal and the second probing signal, and determine the beam width information according to the channel quality and the angular speed.

In one embodiment, the feedback module is adapted to select quantization accuracy according to SNR of a reference signal and the angular speed, and perform quantization according to the selected quantization accuracy to acquire the channel direction information.

In one embodiment, the feedback module is further adapted to predict a modulation and coding scheme to be used by the transmitting end after adjusting the beamforming weights of the transmission beam according to the channel direction information and/or beam width information fed back by the receiving end, and take the modulation and coding scheme as the predicted channel quality information.

In one embodiment, the feedback module is adapted to perform the prediction through measuring the first probing signal and the second probing signal.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for acquiring channel state information, comprising:
   transmitting, by a transmitting end, a first probing signal and a second probing signal in at least one probing zone; and
   receiving, from a receiving end, the channel state information acquired based on measurement of the first probing signal and the second probing signal,
   wherein the channel state information comprises beam width information, adaptively quantized channel direction information, and estimated channel quality information.

2. The method of claim 1, wherein
the estimated channel quality information is a modulation and coding scheme to be used by the transmitting end after adjusting a beamforming pattern.

3. The method of claim 2, further comprising:
transmitting, by the transmitting end, data according to the modulation and coding scheme.

4. A base station, comprising:
   a signal transmitter; and
   a feedback receiver configured to transmit a first probing signal and a second probing signal in at least one probing zone, and to receive from a receiving end channel state information which is acquired based on measurement of the first probing signal and the second probing signal,
   wherein the channel state information includes beam width information, adaptively quantized channel direction information, and estimated channel quality information.

5. A method for feeding back channel state information, comprising:

receiving, by a receiving end, a first probing signal and a second probing signal in at least one probing zone;

acquiring channel state information based on the first probing signal and the second probing signal; and transmitting a feed back message including the channel state information to a transmitting end, wherein the channel state information comprises beam width information, adaptively quantized channel direction information, and estimated channel quality information.

6. The method of claim 5, further comprising:

estimating a modulation and coding scheme to be used by the transmitting end after the transmitting end adjusts beamforming weights according to the channel direction information and/or beam width information fed back by the receiving end, and taking the estimated modulation and coding scheme as the estimated channel quality information.

7. The method of claim 6, wherein the estimation of the modulation and coding scheme is performed based on measurement of the first probing signal and the second probing signal.

8. The method of claim 5, wherein:

beamforming weights of the first probing signal is an N-dimension vector, beamforming weights of the second probing signal is an N-dimension vector, and the N denotes a number of antennas at the transmitting end, former N/2 elements of beamforming weights of the second probing signal are same as former N/2 elements of beamforming weights of the first probing signal, latter N/2 elements of the beamforming weights of the second probing signal and latter N/2 elements of the beamforming weights of the first probing signal are opposite each other, and the method is further comprising:

selecting, by the receiving end, quantization accuracy according to a Signal-to-Noise Ratio (SNR) of a reference signal and a moving angular speed, and obtaining the adaptively quantized channel direction information by performing quantization according to the selected quantization accuracy.

9. The method of claim 5, wherein:

beamforming weights of the first probing signal is an N-dimension vectors, beamforming weights of the second probing signal is an N-dimension vectors, and the N denotes a number of antennas at the transmitting end, former N/2 elements of beamforming weights of the second probing signal are a same as former N/2 elements of beamforming weights of the first probing signal, latter N/2 elements of the beamforming weights of the second probing signal and latter N/2 elements of the beamforming weights of the first probing signal are opposite each other, and the method is further comprising:

estimating a modulation and coding scheme to be used by the transmitting end after the transmitting end adjusts the beamforming weights according to the adaptively quantized channel direction information and/or beam width information fed back by the receiving end, and taking the estimated modulation and coding scheme as the estimated channel quality information.

10. A terminal, comprising:

a signal receiver configured to receive a first probing signal and a second probing signal in at least one probing zone; and a feedback transmitter configured to acquire channel state information based on the first probing signal and the second probing signal, and to transmit a feedback message including the channel state information to a transmitting end, wherein the channel state information comprises beam width information, adaptively quantized channel direction information, and estimated channel quality information.

* * * * *